(12) United States Patent
Wang

(10) Patent No.: US 10,417,620 B2
(45) Date of Patent: Sep. 17, 2019

(54) USER ATTRIBUTE VALUE TRANSFER METHOD AND TERMINAL

(71) Applicant: Tencent Technology (Shenzhen) Company Limited, Shenzhen (CN)

(72) Inventor: Xiaoye Wang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 16/157,980

(22) Filed: Oct. 11, 2018

(65) Prior Publication Data

US 2019/0043030 A1    Feb. 7, 2019

Related U.S. Application Data

(63) Continuation of application No. 15/110,316, filed as application No. PCT/CN2015/089417 on Sep. 11, 2015, now Pat. No. 10,127,529.

(30) Foreign Application Priority Data

Oct. 22, 2014   (CN) .......................... 2014 1 0567731

(51) Int. Cl.
   *G06Q 20/10*   (2012.01)
   *G06F 3/0488*   (2013.01)
   (Continued)

(52) U.S. Cl.
   CPC .......... *G06Q 20/10* (2013.01); *G06F 3/0488* (2013.01); *G06F 3/04842* (2013.01);
   (Continued)

(58) Field of Classification Search
   CPC ........ G06Q 20/10; G06Q 20/12; G06Q 20/32; G06F 3/04842; G06F 3/04845;
   (Continued)

(56) References Cited

U.S. PATENT DOCUMENTS 9,864,982 B2 *   1/2018   Bristow ............. G06Q 20/3224
2011/0933374         4/2011   Messina et al.
(Continued)

FOREIGN PATENT DOCUMENTS

CN   101520924 A   9/2009
CN   103076879 A   5/2013
(Continued)

OTHER PUBLICATIONS

Tencent Technology, ISRWO, PCT/CN2015/089417, Dec. 10, 2015, 7 pgs.

(Continued)

*Primary Examiner* — Wesley J Tucker
(74) *Attorney, Agent, or Firm* — Morgan, Lewis & Bockius LLP

(57) ABSTRACT

A mobile terminal receives a user instruction for performing facial recognition to a picture displayed on the mobile terminal and highlights each human face in the picture by a corresponding face identifying object. After receiving a user selection of two or more face identifying objects and a user-inputted target attribute value for each face identifying object, the mobile terminal generates an attribute value transfer request according to the user-inputted target attribute values, facial recognition information associated with the face identifying objects, and a first user identifier associated with the mobile terminal and sends the attribute value transfer request to a remote server. The server determines a second user identifier based on the facial recognition information associated with each face identifying object and transfers a corresponding target attribute value between the first and second user identifiers when the second user identifier is on a user-relationship chain of the first user identifier.

20 Claims, 12 Drawing Sheets

(51) Int. Cl.
*G06K 9/00* (2006.01)
*H04L 12/24* (2006.01)
*H04L 29/12* (2006.01)
*G06F 3/0484* (2013.01)
*H04L 29/08* (2006.01)
*G06Q 20/12* (2012.01)
*G06Q 20/32* (2012.01)
*H04W 88/02* (2009.01)

(52) U.S. Cl.
CPC ..... *G06F 3/04845* (2013.01); *G06K 9/00228* (2013.01); *G06Q 20/12* (2013.01); *G06Q 20/32* (2013.01); *H04L 41/22* (2013.01); *H04L 61/6063* (2013.01); *H04L 67/306* (2013.01); *G06K 9/00221* (2013.01); *H04W 88/02* (2013.01)

(58) Field of Classification Search
CPC .............. G06F 3/0488; G06K 9/00228; G06K 9/00221; H04L 61/6063; H04L 41/22; H04L 67/306; H04W 88/02
See application file for complete search history.

(56) References Cited

U.S. PATENT DOCUMENTS

| | | |
|---|---|---|
| 2012/0084200 A1 | 4/2012 | Triana |
| 2013/0218721 A1 | 8/2013 | Borhan et al. |
| 2013/0218757 A1* | 8/2013 | Ramanathan ........ G06Q 20/385 705/39 |
| 2015/0012426 A1 | 1/2015 | Purves et al. |
| 2015/0046320 A1 | 2/2015 | Baldwin |
| 2015/0073907 A1 | 3/2015 | Purves et al. |
| 2015/0081544 A1 | 3/2015 | Schulz et al. |
| 2015/0095228 A1* | 4/2015 | Su .......................... G06Q 20/12 705/44 |
| 2015/0348045 A1* | 12/2015 | Agarwal ............ G06K 9/00248 705/44 |
| 2016/0125383 A1* | 5/2016 | Chan .................. G06Q 20/3224 705/39 |
| 2016/0125413 A1* | 5/2016 | Lin .................... G06Q 20/3224 705/44 |
| 2017/0124540 A1* | 5/2017 | Chan .................. G06Q 20/3224 |

FOREIGN PATENT DOCUMENTS

| | | |
|---|---|---|
| CN | 103457943 A | 12/2013 |
| CN | 103699988 A | 4/2014 |
| CN | 103824068 A | 5/2014 |
| CN | 103824180 A | 5/2014 |
| CN | 104901994 A | 9/2015 |

OTHER PUBLICATIONS

Tencent Technology, IPRP, PCT/CN2015/089417, Apr. 25, 2017, 5 pgs.

* cited by examiner

USER ATTRIBUTE VALUE TRANSFER METHOD AND TERMINAL

CROSS REFERENCE TO RELATED APPLICATIONS

This application is a continuation application of U.S. patent application Ser. No. 15/110,316, entitled "USER ATTRIBUTE VALUE TRANSFER METHOD AND TERMINAL", filed Jul. 7, 2016, which is a 371 National Phase application of PCT/CN2015/089417, filed on Sep. 11, 2015, which claims priority to Chinese Patent Application No. 201410567731.4 filed with the State Intellectual Property Office of the People's Republic of China on Oct. 22, 2014, and entitled "USER ATTRIBUTE VALUE TRANSFER METHOD AND TERMINAL IN A NETWORK SYSTEM", all of which are incorporated by reference in their entirety.

TECHNICAL FIELD

The present disclosure relates to network system technologies, and more specifically, to a user attribute value transfer method and terminal.

BACKGROUND OF THE INVENTION

With the development of the Internet, people have constructed a variety of network systems to solve various problems encountered in their lives. In a network system, each user is mapped essentially as one or more data objects, and different data objects have different attributes. The attribute values can be generally categorized into a numeric type and a non-numeric type. A typical example of numeric type is a value used to store the number of resources owned by a user. The resources owned by the user may be the number of solid materials (for example, goods) owned by the user, or virtual resources (for example a variety of tokens such as game currencies, or points released by various online service providers), or the account balance of the user in a banking system, etc.

When two transaction parties want to carry out a transaction operation in an online transaction system, a value transfer operation between the two transaction parties will be involved. In traditional art, such a value transfer operation is generally initiated by a user. For example, when a user wants to deliver game currencies to other users via an online gaming system, he can deliver the game currencies through a transaction system or mail system established in the game. In the transaction system, the user needs to find the other party's virtual character before conducting a face-to-face (in a same virtual scene) transaction process; while in the mail system, the user needs to enter the recipient's username, email address, etc. for uniquely identifying the recipient, and then needs to enter a transfer value expected by each recipient. In an online payment system, such as online banking, third-party payment or other financial accounts, each time when a user wants to make fund transfer (in such a case, an account balance is mapped to an attribute value of the user) to others, he still needs to enter an account number and a transfer amount of a recipient.

That is, in various network systems, if an initiating user wants to transfer an attribute value, it is a necessary step to input or select target users and input transfer values. However, in traditional art, when a user needs to initiate value transfer operations for multiple users simultaneously, he needs to select or enter the values one by one; the process is quite complicate, and it costs the initiating user quite long time to enter or select the target users and the values.

SUMMARY

According to a first aspect of the present application, a user attribute value transfer method is performed at a mobile terminal having one or more processors and memory storing programs to be executed by the one or more processors. After obtaining a picture, the mobile terminal receives a user instruction for performing facial recognition to the picture and highlights each human face in the picture by a corresponding face identifying object. After receiving a user selection of two or more face identifying objects and a user-inputted target attribute value for each face identifying object, the mobile terminal generates an attribute value transfer request according to the user-inputted target attribute values, facial recognition information associated with the face identifying objects, and a first user identifier associated with the mobile terminal and sends the attribute value transfer request to a remote server. The server determines a second user identifier based on the facial recognition information associated with each face identifying object, verifies whether the second user identifier is on a user-relationship chain of the first user identifier, and transfers a corresponding user-inputted target attribute value between the first user identifier and the second user identifier when the second user identifier is on the user-relationship chain of the first user identifier.

According to a second aspect of the present application, a mobile terminal includes a processor, a storage medium and a plurality of instructions stored in the storage medium that, when executed by the processor, cause the mobile terminal to perform the aforementioned user attribute value transfer method.

According to a third aspect of the present application, a non-transitory computer readable storage medium in connection with a mobile terminal stores a plurality of instructions that, when executed by a processor of the mobile terminal, cause the mobile terminal to perform the aforementioned user attribute value transfer method.

BRIEF DESCRIPTION OF THE DRAWINGS

To describe the technical approaches in the embodiments of the present invention and in traditional art more clearly, the following briefly introduces the accompanying drawings required for describing the embodiments and the traditional art. Apparently, the accompanying drawings in the following description show merely some embodiments of the present invention, and a person of ordinary skill in the art may still derive other drawings from these accompanying drawings without creative efforts.

DETAILED EMBODIMENTS OF THE INVENTION

To further illustrate the technical means and effects used by the present disclosure to achieve the intended purpose of the disclosure, hereinafter, detailed implementations, structures, characters and effects of the present disclosure will be described in detail in conjunction with the drawings.

Figure 1:
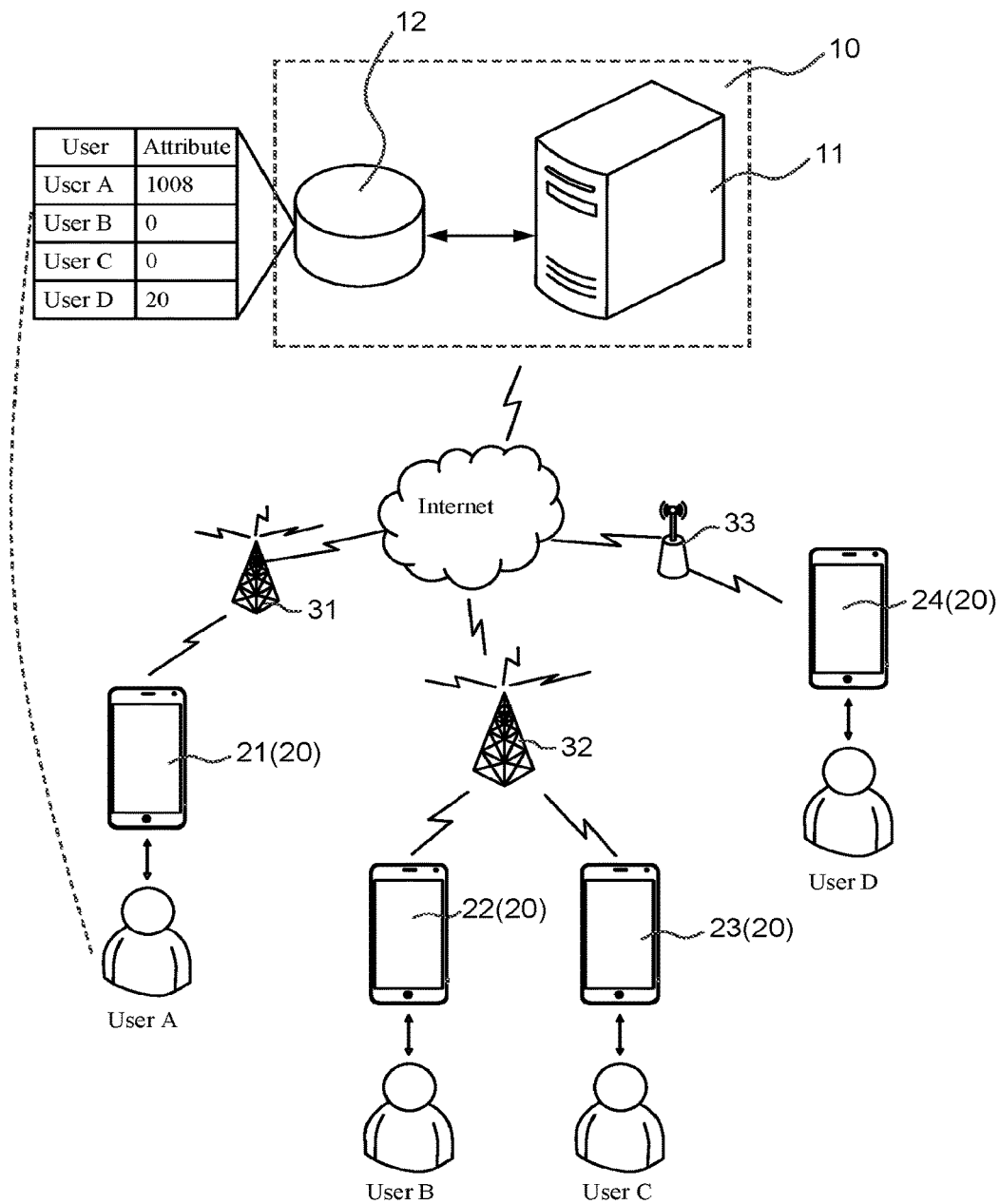
FIG. 1 is a schematic diagram of architecture of a user attribute value transfer system according to an embodiment.

FIG. 1 is a schematic diagram of architecture of a user attribute value transfer system according to a first embodiment of the present disclosure, in which the user attribute value transfer system may be applied to a network system. As shown in FIG. 1, the user attribute value transfer system of the present embodiment includes a server system 10 and a plurality of user terminals 20. The server system 10 may include one or more servers 11 and a database 12. The server 11 can read or modify data stored within the database 12. In the present embodiment, data objects which are one-to-one mapping to users may be stored within the user database 12. Depending on different application scenarios, these data objects may be used for different purposes. For example, in an online gaming system, data objects may be used to describe a user's virtual character, and the virtual character may have many attribute values, such as the values of game currencies owned by the virtual character, the number of virtual items owned by the virtual character, etc., and these data or quantities can be used as attributes of the data objects and can be stored. As another example, in an online transaction system, data objects can be used to describe the number of resources (both virtual resources and physical assets) owned by a user, such as a bank account balance or the number of products owned by the user.

In a relational database, one data object may correspond to one or multiple records, and one attribute, for example, may correspond to one or more fields. In a database where data are stored as files, a data object may correspond to one or more copies of files, or a certain clip of a file.

It will be appreciated that, no matter what kind of storage model is used in the database, their essence is to map a user to one or more data objects, and the server 11 can realize a value transfer operation between users by operating these data objects, so as to realize online transaction, payment, gift and other functions of virtual items or physical goods.

In this embodiment, the above-described a plurality of user terminals 20 includes a first user terminal 21, a second user terminal 22, a third user terminal 23, and a fourth user terminal 24. The specific examples of these user terminals 20 may include, but not limited to smart phones, tablet computers, desktop computers, laptop computers, wearable devices. The user terminal 20 may access the Internet in various ways, and may perform network data exchanges with the server system 10.

For example, if the first user terminal 21 is a smart phone, the first user terminal 21 may access to the Internet via a mobile base station 31; the second user terminal 22 and the third user terminal 23 may access to the Internet via the same mobile station 32; and the fourth user terminal 23 may access to the Internet via a Wifi hotspot 33.

The user may use various network services provided by the server system 10 by operating the user terminal 20 and the server system 10 for network data exchanges. In architecture shown in FIG. 1, the first user terminal 21, the second user terminal 22, the third user terminal 23 and the fourth user terminal 24, respectively, correspond to users A, B, C, D.

The user attribute value transfer system of the present embodiment is used to perform an attribute value transfer operation between different users, and hereinafter, a detailed working process of the user attribute value transfer system of the present embodiment will be described in specific application scenarios.

Figure 2:
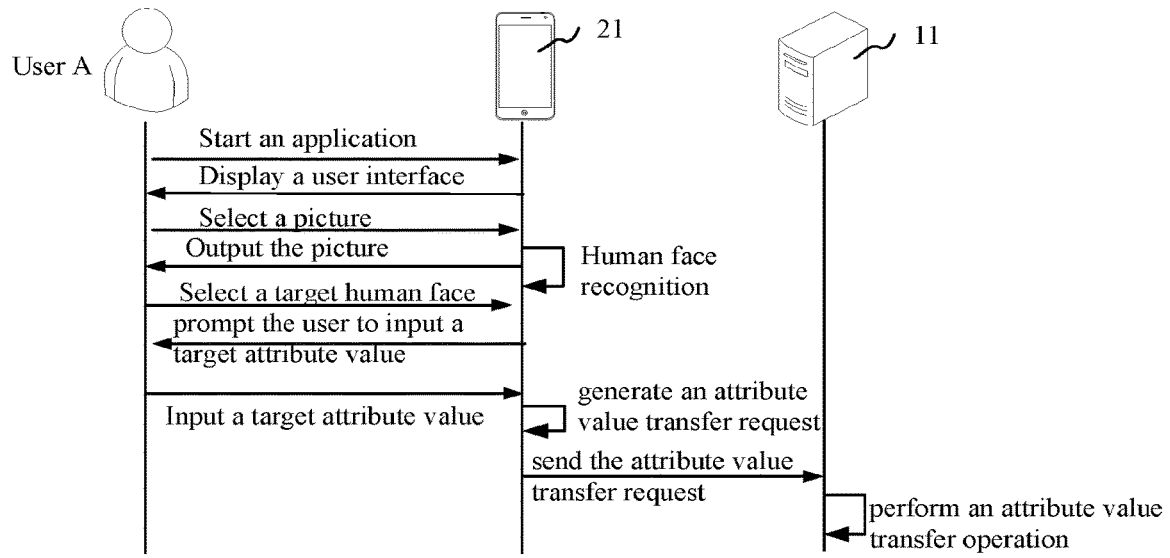
FIG. 2 is a sequence diagram of interactions during an attribute value transfer operation performed in a user attribute value transfer system according to an embodiment.

Referring to FIG. 2, which is a sequence diagram of interactions during an attribute value transfer operation performed in a user attribute value transfer system according to an embodiment. First, an initiating user (a user who initiates an attribute value transfer operation, for example, the initiating user is user A in the present embodiment) starts an application (a stand-alone application or a functional module of an application) installed in the first user terminal 21. Accordingly, after the application is started, an interface of the application is displayed, and in this interface, the user may select a picture stored in the first user terminal 21 or start a shooting function of the first user terminal 21 to take a picture in real time, in which the selected picture or the picture taken in real time needs to include at least a transaction counterparty with which the attribute value transfer operation is to be performed by the user. For example, in this embodiment, the transaction counterparty may be the users B, C and D.

After obtaining the picture selected by the user through the application, the first user terminal 21 carries out an interaction with the user according to the selected picture to determine the transaction counterparties with which the current user wants to perform attribute value transfer operations and a target attribute value for each transaction counterparty.

Figure 3:
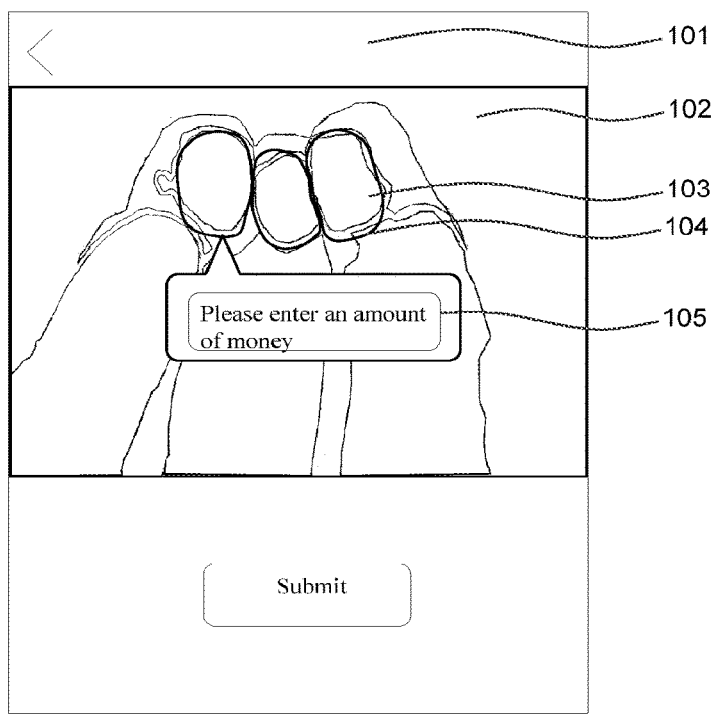
FIG. 3 is a first schematic interface on a first user terminal when an attribute value transfer operation is performed in a user attribute value transfer system according to an embodiment.

Specifically, first, the first user terminal 21 may perform facial recognition to recognize all human faces within the picture through the application, and output the picture selected by the user in the user interface. The purpose of outputting the picture is to let the user select a human face from the picture. Refer to FIG. 3, which is a schematic interface for output of the picture in the first user terminal 21. As shown in FIG. 3, the user interface 101 shows a picture 102, and the picture 102 has three human faces 103 therein. When the first user terminal 21 includes a touch screen, in order to detect a human face selection instruction from a user with respect to the picture 102, the first user terminal 21 may track a click or a touch performed by the user on the first user terminal 21. That is, the human face selection instruction may include a user input operation such as a click or a touch.

In a particular embodiment, the human face selection instruction is detected in the following manner. During the process of facial recognition, areas where all human faces are located in the picture 102 are identified. The user interface 101 may detect click or touch events in a parent vessel of the picture 102, and when these events are triggered, determine whether a human face is selected. Said parent vessel means a variety of interface elements (or controls) accommodating the picture 102. In an Android system, for example, the parent vessel may be ImageView controls, other operating systems are different from the Android system, but all have similar functional controls.

For a touch screen, the step of determining whether a human face is selected is as follows: obtaining touch point coordinates; determining whether the touch point coordinates are in the areas where the human faces are located; and determining that the user selects a corresponding human face if the touch point coordinates are in an area where the human face is located.

In another particular embodiment, the human face selection instruction is detected in the following manner. During the process of facial recognition, the areas where all human faces are located in the picture 102 are identified. Then, a corresponding identifying object 104 may be displayed in the user interface 101 to correspond to the location where the human face is, and the identifying object 104 may be for example a frame or a transparent floating layer. The application also detects click or touch events on the identifying object. If a click or touch event on the identifying object 104 is triggered, it can be determined that the user selects the corresponding human face. Compared with the previously described way, this way can take advantage of the click or touch event triggering mechanism of the system, and does not need to determine whether the touch point coordinates are within the area where the human face is located each time. In the example shown in FIG. 3, the shape of the identifying object 104 may match the human face, however, it will be appreciated that the identifying object 104 may be a regular shape, such as rectangular, circular, or square, and in such a case, it makes the coordinates determining process much simpler and more efficient by detecting the click or touch event on the identifying object 104.

Upon detecting a user instruction that the user selects a human face, e.g., when an identifying object 104 being clicked on or touched, the first user terminal 21 may display a text input box 105, to prompt the user to enter a value corresponding to the selected human face, and this value indicates an attribute value that will be transferred between the current user and the user corresponding to the target human face. In a specific embodiment, using a positive number indicates that the current user needs to transfer an attribute value to the user corresponding to the selected target human face; and a negative number indicates that the user corresponding to the selected target human face needs to transfer the attribute value to the current user. Of course, it may be also pre-determined that a positive number indicates that the user corresponding to the selected target human face needs to transfer the attribute value to the current user, while a negative number indicates that the current user needs to transfer the attribute value to the user corresponding to the selected target human face.

Figure 4:
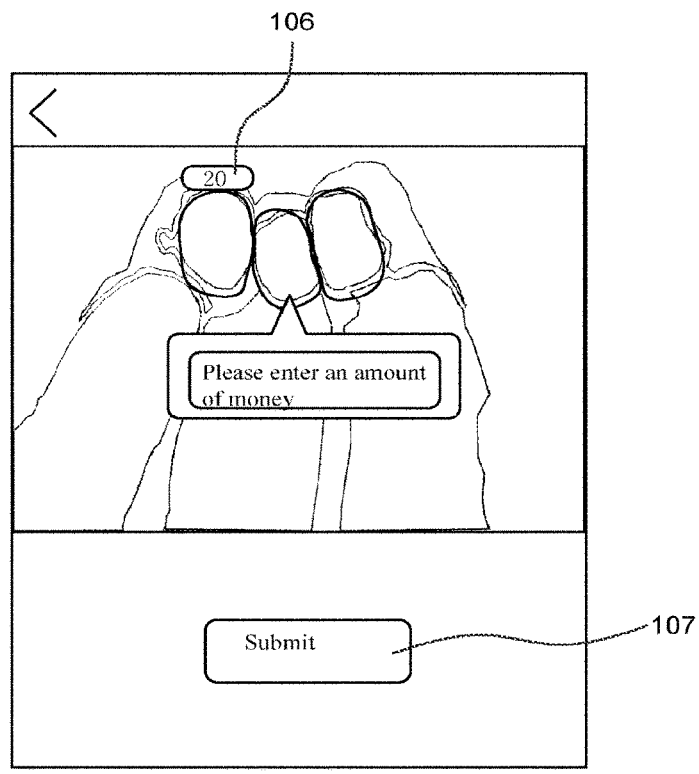
FIG. 4 is a second schematic interface on a first user terminal when an attribute value transfer operation is performed in a user attribute value transfer system according to an embodiment.

Upon completion of a selection of a target human face and an input of a target attribute value, the target attribute value entered by the user may be obtained and stored. Referring to FIG. 4, furthermore, in order to allow the user to keep abreast of the entered value, prompt information may also be displayed in the user interface 101. For example, a prompt box 106 may be displayed above the target human face, and the content of the prompt box 106 may include the value just entered by the user. The user may choose a target human face at any time to change the entered value.

Referring to FIG. 4, the user interface 101 may also include a submit button 107, and after the submit button 107 is pressed, the application generates an attribute value transfer request based on the value entered by the user. The attribute value transfer request may include, for example recognition information corresponding to each recognized human face and corresponding values; the attribute value transfer request may also include recognition information of the current user. After the attribute value transfer request is generated, it may also be encrypted. Then, a predetermined network protocol (such as a hypertext transfer protocol) may be used to send the attribute value transfer request to the server 11.

Figure 5:
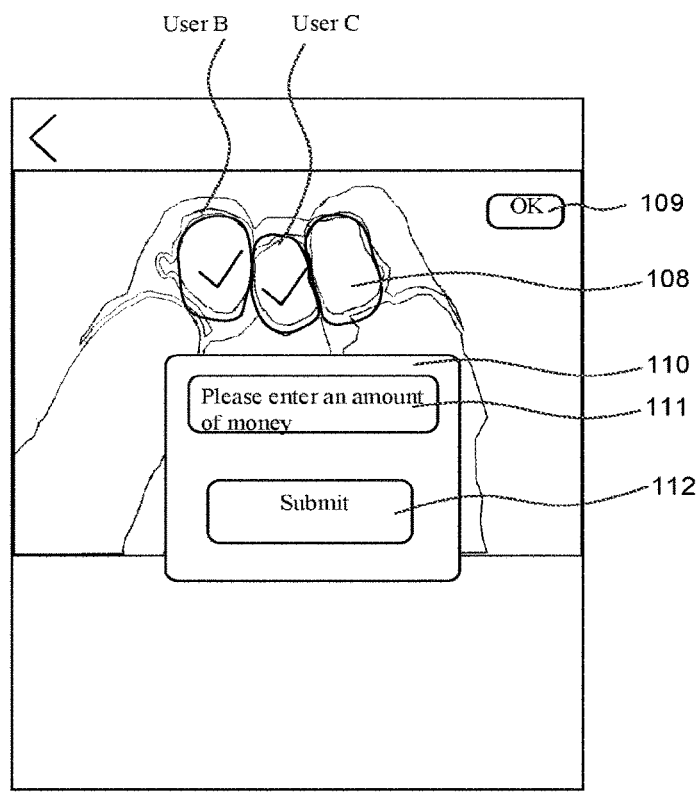
FIG. 5 is a third schematic interface on a first user terminal when an attribute value transfer operation is performed in a user attribute value transfer system according to an embodiment.

In the above described manners, the user is required to enter a target attribute value for each target human face, but the method of entering the target attribute value is not limited to the above; for example, a user may select a target human face from the picture first. Referring to FIG. 5, according to a manner similar to that in FIG. 3, the user interface may also display an identifying object 108 in the area where a human face is located. Both the identifying object 108 and the identifying object 104 in FIG. 3 can respond to a user's click or touch event, but the responding manners of the identifying object 108 and the identifying object 104 are different. In the manner shown in FIG. 5, the click or touch on the identifying object 108 indicates a switch between a selected state and an unselected state of the target human face. That is, the user can click on the identifying object 108 to select a target human face. By default, all identifying objects 108 may be in a selected or an unselected state. After the selection of the target human faces, the user can click on the button 109 to confirm the selection.

Referring to FIG. 5, when the button 109 is clicked on, the application pops up a pop-up window 110 which includes an input box 111 and a button 112, in which the input box 111 allows the user to enter a total number. After the input is completed, the user can confirm via the button 112. When the button 112 is clicked on, the application determines all target human faces selected by the user based on the selected or unselected state of the identifying object 108, and the target attribute value for each target human face equals to a value obtained by dividing the total number by the number of all target human faces selected by the user. Then, similar to the process after the button 107 is pressed, the application will send an attribute value transfer request to the server 11.

In summary, any method in which the target user for attribute value transfer is selected by clicking and selecting the human faces in the picture can be applied to the present embodiment, and the target attribute value of each target user may be determined by performing an average calculation, or may be separately entered.

The server 11 executes a corresponding value transfer operation after receiving the attribute value transfer request sent by the first user terminal 21. First, the server 11 resolves users who request attribute value transfer and a corresponding target attribute value from the attribute value transfer request. For example, the server 11 obtains a corresponding user identifier (ID) based on facial recognition information. It should be appreciated that, in order to obtain the corresponding user ID according to facial recognition information, facial recognition information for each user should be pre-stored in the database 12. And then after receiving the value transfer request sent by the first user terminal 21, the server 11 may retrieve facial recognition information in the attribute value transfer request, and may obtain the corresponding user ID by searching the database according to retrieved facial recognition information.

In a specific application scenario, the attribute value transfer request is resolved to obtain following data: User A: −45; User B: 20; User C: 10; User D: 15. After these data is obtained, data in the database 12 may be modified by adding the obtained values to the attribute value of each associated user. It should be understood that, according to the values in this application scenario, the attribute value of user A is reduced by 45, the attribute value of user B is increased by 20, the attribute value of user C is increased by 10, and the attribute value of user D is increased by 15. Therefore, in this scenario, user A transfers a certain amount of the attribute value to user B, user C and user D, respectively. It will be appreciated that the sum of the changes of the attribute values for all users involved in one attribute value transfer operation should equal to zero.

In another specific application scenario, the attribute value transfer request is resolved to obtain following data: User A: −25; User B: 20; User C: −10; User D: 15. After obtaining these data, data in the database 12 may be modified by adding the obtained values to the attribute value of each associated user. It should be understood that, according to the values in this application scenario, the attribute value of user A is reduced by 25, the attribute value of user B is increased by 20, the attribute value of user C is reduced by 10, and the attribute value of user D is increased by 15. Therefore, in this scenario, user A and user C are transferors and user B and user C are recipients.

In another specific application scenario, the attribute value transfer request is resolved to obtain following data: User A: 30; User B: −10; User C: −10; User D: −10. After obtaining these data, data in the database 12 may be modified by adding the obtained values to the attribute value of each associated user. It should be understood that, according to the values in this application scenario, the attribute value of user A is increased by 30, the attribute values of user B, user C and user D are reduced by 10, respectively. Therefore, in this scenario, user A receives attribute values from each of the other users.

In another specific application scenario, the attribute value transfer request is resolved to obtain following data: User A: 30; User B: −10; User C: −10; User D: −10. After obtaining these data, data in the database 12 may be modified. However, different from the previous manner, data in the database 12 is modified not by adding the obtained values to the attribute value of each associated user, but by the following steps: extracting a certain percentage of the obtained values (for example, 1%) to transfer it to a third-party. Therefore, in such a case, the attribute value of user A is increased by 30*(1−1%)=29.7.

According to the above, attribute value transfer operations between different users can be realized. It should be understood that in these ways, as long as the initiating user initiates an attribute value transfer request, the value transfer operation is performed directly. In a case where the initiating user wants to transfer the attribute value to other users using the application, the above solutions will not lead to data security issues, but, in a case where the initiating user receives the attribute value from other users using the application, the above solutions will lead to data security issues.

Figure 6:
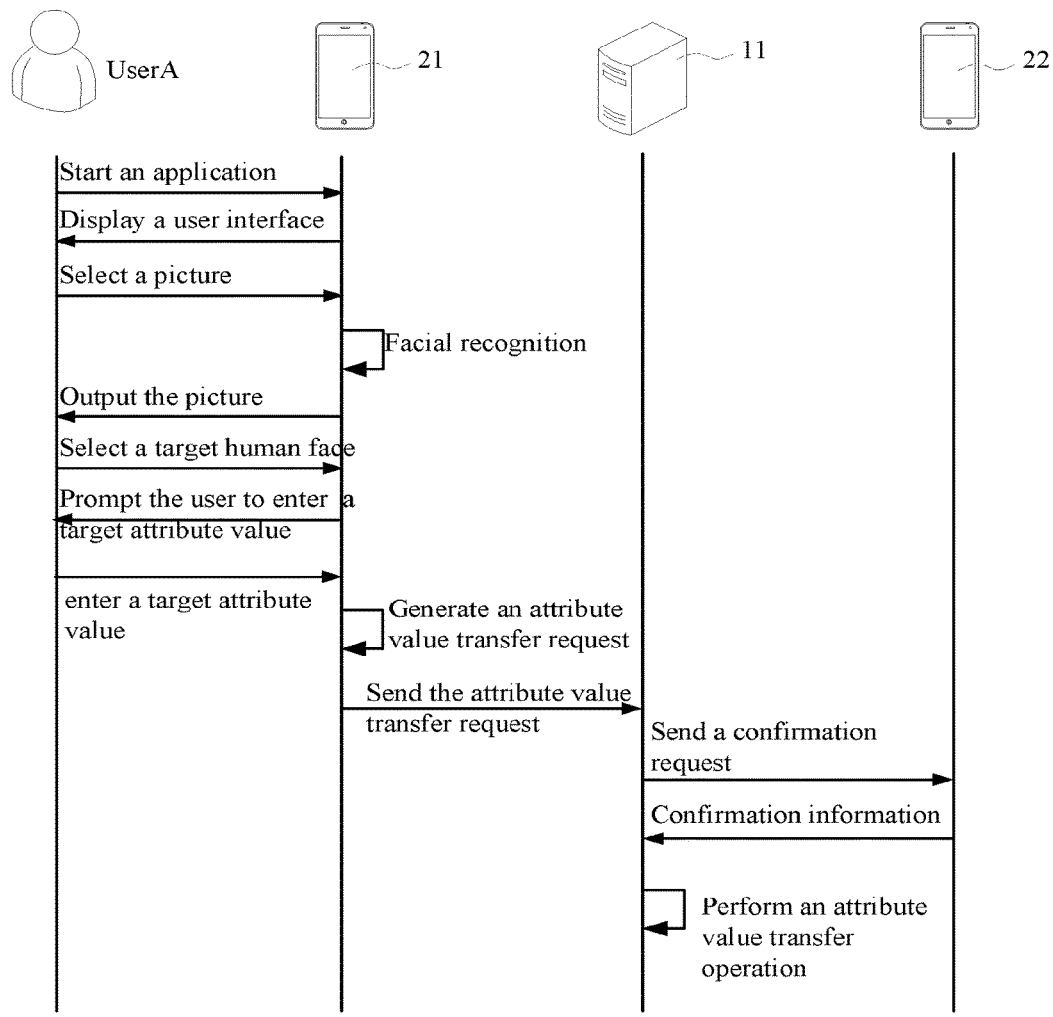
FIG. 6 is a sequence diagram of interactions during an attribute value transfer operation performed in a user attribute value transfer system according to an embodiment.

Therefore, during the process of responding to the attribute value transfer request, referring to FIG. 6, prior to the formal value modification operations, a process of an authorization confirmed by other users may be conducted. For example, for an attribute value transfer request, the server 11 may push a confirmation request to each involved user (except for the initiating user), and the other users can receive the confirmation request when they start corresponding applications on other user terminals. For example, the user B may receive the confirmation request pushed by the server 11 through the application within the second user terminal 22, or inquire the server 11 whether there is a confirmation request for the user B. Other users can perform similarly, and description thereof will not be repeated any more.

Figure 7:
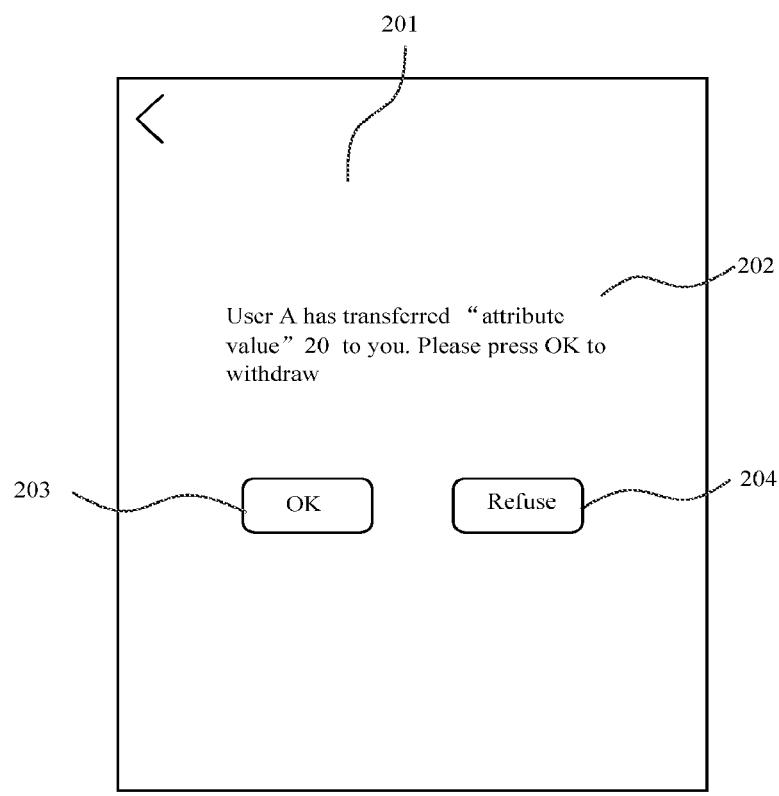
FIG. 7 is a first schematic interface on a second user terminal when an attribute value transfer operation is performed in a user attribute value transfer system according to an embodiment.

After receiving the confirmation request sent by the server 11, the application may output the confirmation request via the user interface, and the user may confirm the confirmation request. Referring to FIG. 7, FIG. 7 shows a schematic interface shown after the application within the second user terminal 22 receives the confirmation request sent by the server 11. The user interface 201 includes a confirmation request 202, a button 203 and a button 204. Among them, the button 203 is used for user B to confirm to withdraw the attribute value transferred from user A, and the button 204 is used for user B to refuse the attribute value transferred from user A. After the button 203 or button 204 is pressed, the application generates corresponding confirmation information and sends confirmation information to the server 11. Accordingly, after the confirmation request is confirmed by user B, or after a confirmation message that acknowledges reception of the confirmation request sent by the second user terminal 22 is received, the server 11 performs the corresponding value transfer operation for user B, i.e., transferring a corresponding value from the attribute value of user A to the attribute value of user B. For each user, performing this process will complete the entire attribute value transfer operation.

Figure 8:
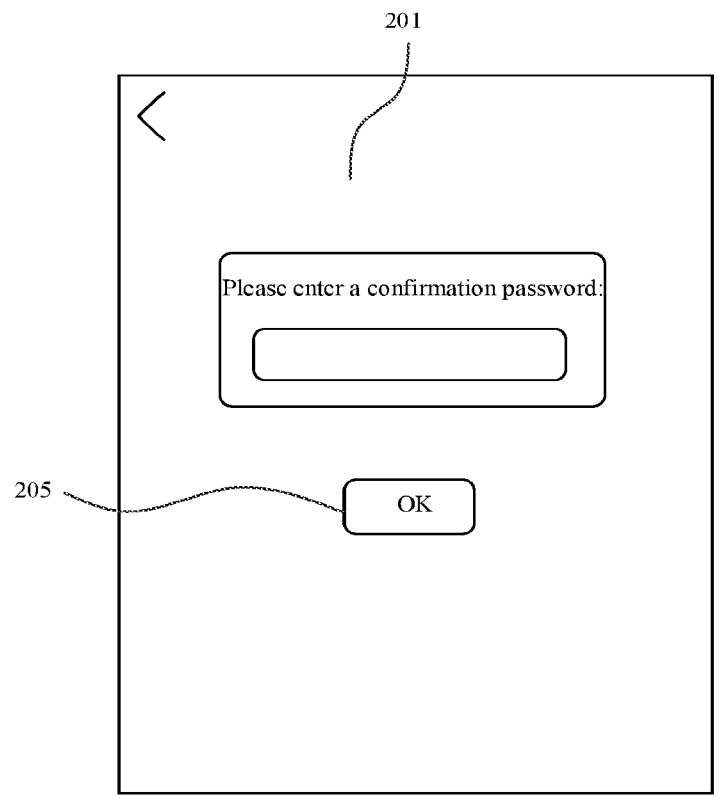
FIG. 8 is a second schematic interface on a second user terminal when an attribute value transfer operation is performed in a user attribute value transfer system according to an embodiment.

To further improve security, when the button 203 is pressed, a confirmation request may not be sent immediately, but the following steps may be performed. As shown in FIG. 8, additional authentication may be required for the user, for example, the user should enter a confirmation password, or a dynamic password, a SMS verification code, etc. reserved in the network system for authentication. After the button 205 is pressed, the second terminal 22 verifies authentication information entered by the user, and sends confirmation information that indicates that the user accepts the attribute value transfer request, to the server 11 only when verification is passed.

Figure 9:
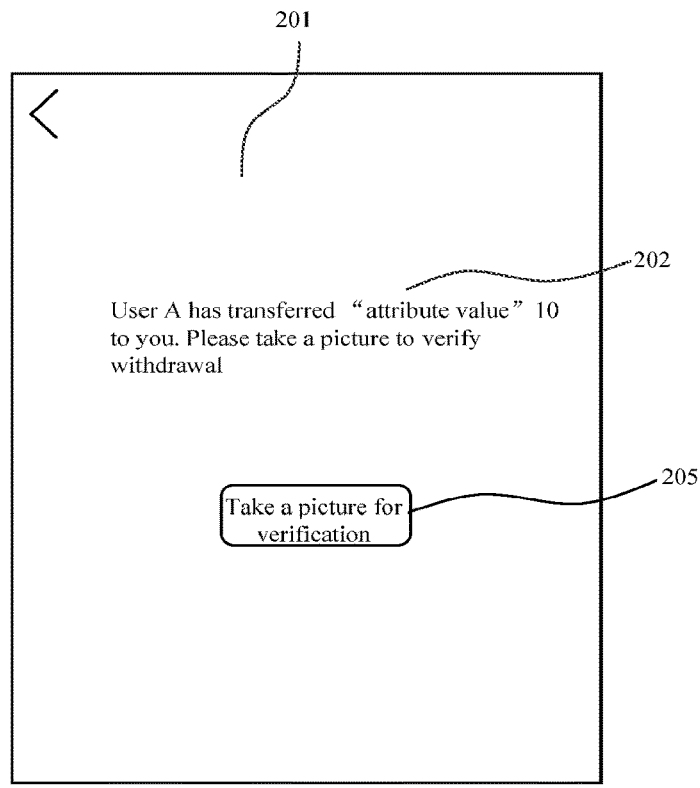
FIG. 9 is a third schematic interface on a second user terminal when an attribute value transfer operation is performed in a user attribute value transfer system according to an embodiment.

It is appreciated that it is not limited to the means shown in the interface 201 to allow a user to confirm the confirmation request. Referring to FIG. 9, in another embodiment, the user interface 201 includes a confirmation request 202, and a button 205. After the button 205 is pressed, the application starts the camera to take a picture of the current user, and sends the taken picture or facial recognition information for the picture to the server 11 for verification. According to this embodiment, using facial recognition instead of entering a password by the user or other authentication measures can enhance convenience and security for the user.

If a picture is received, the server 11 first performs a facial recognition analysis. Take user B as an example. Assume that the attribute value transfer request includes facial recognition information of the user B, if facial recognition information of the user B included in the attribute value transfer request matches facial recognition information uploaded by the second user terminal 22 or matches a facial recognition result of a picture uploaded by the second user terminal 22, user authorization is passed, then the server 11 may perform a value transfer operation, i.e., modifying data within the database 12.

Figure 10:
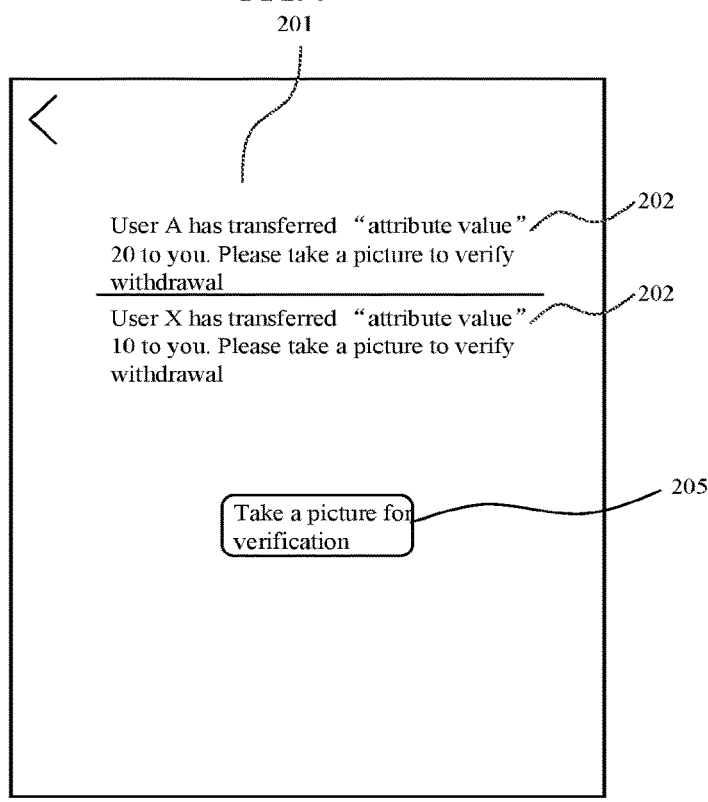
FIG. 10 is a fourth schematic interface on a second user terminal when an attribute value transfer operation is performed in a user attribute value transfer system according to an embodiment.

Referring to FIG. 10, it is understood that at some time, the same user may receive multiple confirmation requests, and in such cases, the user may confirm all confirmation requests at one time. For example, the user may send confirmation information once for each confirmation request, respectively, or may incorporate confirmation information for all confirmation requests in one piece of confirmation information. As such, after the server 11 receives confirmation information transmitted by the second user terminal 22, the server 11 performs an attribute value transfer operation based on received confirmation information, i.e., modifying attribute values within the database.

According to the user attribute value transfer system of the present embodiment, a user may initiate an attribute value transfer operation via a picture. That is, the user needs to only click on a human face in the picture and enter a value to be transferred, without entering a user account, thereby enhancing convenience for the user to initiate an attribute value transfer operation. Moreover, by the way of facial recognition, typing errors may be prevented from occurring when the user account is entered, so as to enhance security of the attribute value transfer operation.

Figure 11:
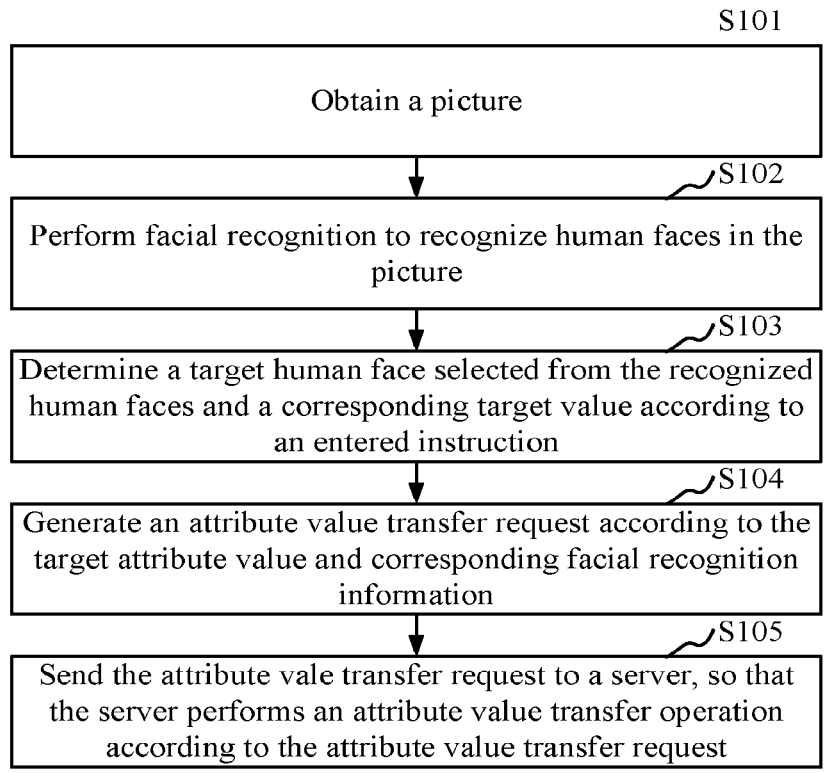
FIG. 11 is a flowchart of a user attribute value transfer method according to an embodiment.

FIG. 11 is a flowchart of a user attribute value transfer method according to an embodiment of the present disclosure, and this user attribute value transfer method may be applied to a network system. As shown in FIG. 11, the method according to the present embodiment may include the following steps.

In step S101, a picture is obtained.

Specifically, a first user terminal 21 obtains a picture selected by an initiating user. The initiating user means a user who initiates an attribute value transfer operation, and the initiating user is user A in this embodiment. The initiating user starts an application (a stand-alone application or a functional module of the application) installed in the first user terminal 21. Accordingly, after the application is started, the application's interface is displayed, and in this interface, the user can select a picture stored in the first user terminal 21 or start a shooting function of the first user terminal 21 to take a picture in real time, in which the selected picture or the picture taken in real time needs to include at least the transaction counterparts that the attribute value transfer operation to be performed.

In step S102, facial recognition is performed to recognize human faces in the picture.

Specifically, the first user terminal 21 may perform facial recognition on the picture to recognize all human faces in the picture. A facial recognition algorithm used here is not subject to any restrictions, and all algorithms that are capable of accurately and effectively recognize the human faces can be applied to the present embodiment.

In an embodiment, facial recognition may be performed by using any one of a template matching-based facial recognition algorithm, subspace analysis-based facial recognition algorithm, local preserving projections (LPP) facial recognition algorithm, principal component analysis (PCA) algorithm, eigenface method (based on KL transform), artificial neural network recognition algorithm and facial recognition algorithm supporting vector machine. Among them, the core idea of the template matching-based facial recognition algorithm is establishing a three-dimensional adjustable model framework based on rules of facial features, and after locating the position of a human face, locating and adjusting the facial features using a model framework, to eliminate the effects of viewing angle, occlusion and facial expression changes during recognition process.

In step S103, a target human face selected from the recognized human faces and a corresponding target attribute value are determined according to an entered instruction.

Specifically, the first user terminal 21 determines the target human face selected from the recognized human faces and the corresponding target attribute value according to the entered instruction. After obtaining a picture selected by the user through the application, the first user terminal 21 performs an interaction with the user according to the selected picture to determine transaction counterparties (target human faces) with which the current user wants to perform attribute value transfer and a target attribute value for each transaction counterparty.

In step S104, an attribute value transfer request is generated according to the target attribute value and corresponding facial recognition information.

Specifically, the first user terminal 21 generates an attribute value transfer request according to the target attribute value and corresponding facial recognition information. The first user terminal 21 generates an attribute value transfer request through an application according to the value entered by the user. The attribute value transfer request may include, for example recognition information corresponding to each recognized human face and corresponding values; the attribute value transfer request may also include recognition information of the current user. After the attribute value transfer request is generated, it may also be encrypted.

In step S105, the attribute value transfer request is sent to a server, so that the server performs an attribute value transfer operation according to the attribute value transfer request.

Specifically, the first user terminal 21 may use a predetermined network protocol (such as a hypertext transfer protocol) to send the attribute value transfer request to the server 11. After receiving the attribute value transfer request, the server 11 performs an attribute value transfer operation according to the attribute value transfer request.

According to the user attribute value transfer method of the present embodiment, a user can initiate an attribute value transfer operation via a picture. That is, the user needs to only click on a human face in the picture and enter a value to be transferred, without entering a user account, thereby enhancing convenience for the user to initiate an attribute value transfer operation. Moreover, by way of facial recognition, typing errors can be prevented when the user account is entered, so as to enhance security of the attribute value transfer operation. In addition, through an automatic, high precision facial recognition technology to automatically determine the object of the attribute value transfer operation, a possible false operation can be avoided, efficiency and accuracy for determining the object of the attribute value transfer operation can be improved, and security of the attribute value transfer operation is further enhanced.

In an embodiment, the method further includes the following steps prior to the step S105: retrieving user information corresponding to the target human face from the server and displaying user information; obtaining a confirmation instruction for confirming displayed user information, and performing step S105 based on the confirmation instruction. In this embodiment, by retrieving user information corresponding to the target human face from the server, the object to which the attribute value transfer operation needs to be performed can be confirmed, so as to prevent the target attribute value being transferred to a non-target user who looks alike the target user.

In an embodiment, step S105 includes: sending the attribute value transfer request to the server, so that the server can verify a social relationship according to the attribute value transfer request in conjunction with the user-relationship chain, and performing the attribute value transfer operation according to the attribute value transfer request if verification is passed.

In this embodiment, the server may verify the social relationship of the two-party users according to the user-relationship chain of the initiating user and facial recognition information in the attribute value transfer request. If there is a social relationship, the attribute value transfer operation can be performed directly according to the attribute value transfer request. If there is not a social relationship, the attribute value transfer request can be refused or the first user terminal is requested for confirmation. After a confirmation instruction is received from the first user terminal, the attribute value transfer operation is performed according to the attribute value transfer request.

In this embodiment, the user-relationship chain is used to verify the social relationships, so that a quick attribute value transfer operation can be performed when there is a social relationship between the two parties, and security of the attribute value transfer operation can be guaranteed through the social relationships. Moreover, the method can prevent transferring the target attribute value to a non-target user who looks like the target user but does not have a social relationship with the user.

Figure 12:
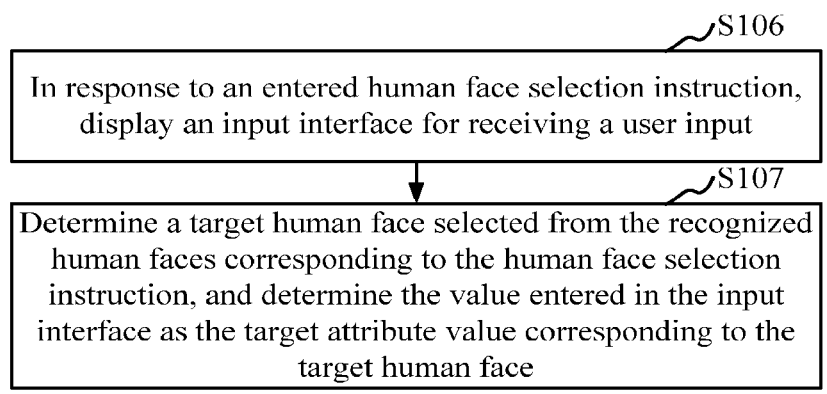
FIG. 12 is a flowchart of determining a target human face selected from recognized human faces and determining a corresponding target attribute value by a first user terminal based on an input instruction according to an embodiment.

Referring to FIG. 12, in an embodiment, step S103 may include the following steps.

In step S106, in response to an entered human face selection instruction, an input interface for receiving a user input is displayed.

Specifically, the first user terminal 21 displays an input interface for receiving a user input in response to an entered human face selection instruction.

In another specific implementation, the human face selection instruction is detected in the following manner. During the process of facial recognition, areas where all human faces are located in the picture 102 are identified. Then, corresponding identifying objects 104 may be displayed in the user interface 101 to correspond to locations where the human faces are, and the identifying objects 104 may be for example a frame or a transparent floating layer. The application also detects a click or touch event on an identifying object. If a click or touch event on an identifying object 104 is triggered, it can be determined that the user selects the corresponding human face. Compared with the previously described way, this way can take advantage of the click or touch event-trigger mechanism of the system, and does not need to determine whether the touch point coordinates are within the area where the human face is located each time. In the example shown in FIG. 3, the shape of the identifying object 104 matches the human face. However, it will be appreciated that the identifying object 104 may be a regular shape, such as rectangular, circular, or square, and in such a case, it makes the coordinates determining process much simpler and more efficient by detecting the click or touch event on the identifying object 104.

In step S107, a target human face that is selected from the recognized human faces corresponding to the human face selection instruction are determined, and the value entered in the input interface is determined as the target attribute value corresponding to the target human face.

Specifically, the first user terminal 21 determines the target human face that is selected from the recognized human faces and is corresponding to the human face selection instruction, and determines the value entered in the input interface as the target attribute value corresponding to the target human face.

Upon detecting a user instruction that the user selects a human face, e.g., when an identifying object 104 being clicked on or touched, a text input box 105 may be displayed, to prompt the user to enter a value corresponding to the selected human face, and this value indicates the attribute value that will be transferred between the current user and the user corresponding to the target human face. In a specific embodiment, using a positive number indicates that the current user needs to transfer an attribute value to the user corresponding to the selected target human face; and a negative number indicates that the user corresponding to the selected target human face needs to transfer the attribute value to the current user. Of course, it may also be predetermined that a positive number indicates that the user corresponding to the selected target human face needs to transfer the attribute value to the current user, while a negative number indicates that the current user needs to transfer the attribute value to the user corresponding to the selected target human face.

According to the present embodiment, the input interface may be triggered by clicking on the human face, in order to enter a corresponding target attribute value into the input interface, without entering a user account, thereby enhancing convenience for the user to initiate an attribute value transfer operation. Moreover, by way of facial recognition, typing errors may be prevented when the user account is entered, so as to enhance security of the attribute value transfer operation. In addition, using facial recognition can efficiently and accurately identify all human faces in a picture, so that the user can quickly enter the corresponding target attribute value in each individual input interface corresponding to each human face, thereby improving efficiency of the attribute value transfer operation. And if there are relative many target human faces needing to be determined, this method can quickly determine multiple target human faces and the corresponding target attribute values in a picture, thereby further improving efficiency of the attribute value transfer operation.

Figure 13:
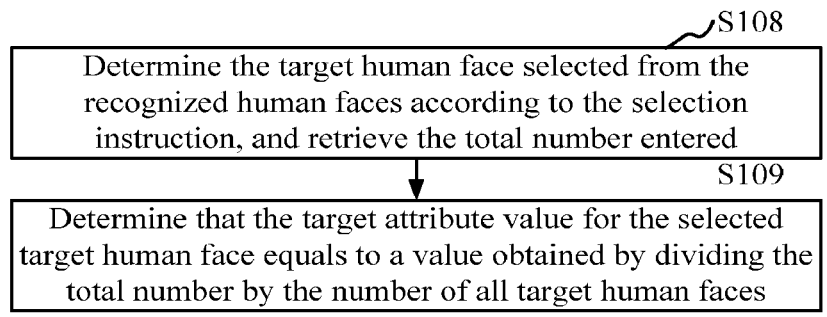
FIG. 13 is a flowchart of determining a target human face selected from recognized human faces and determining a corresponding target attribute value by a first user terminal based on an input instruction according to another embodiment.

Referring to FIG. 13, in one embodiment, step S103 may include the following steps.

In step S108, the target human face that is selected from the recognized human faces is determined according to the selection instruction, and the total number entered is retrieved.

Specifically, the first user terminal 21 determines the target human face that is selected from the recognized human faces according to the selection instruction, and retrieves the total value entered.

In step S109, it is determined that the target attribute value for the selected target human face equals to a value obtained by dividing the total number by the number of all target human faces.

For example, a user may select the target human face from the picture first. Referring to FIG. 5, according to a manner similar to that in FIG. 3, the user interface may also display identifying objects 108 in the areas where the human faces are located. Both the identifying objects 108 and the identifying objects 104 in FIG. 3 can respond to a user's click or touch event, but the responding manners of the identifying objects 108 and the identifying objects 104 are different. In the manner shown in FIG. 5, the click or touch on the identifying object 108 indicates a switch between a case that a target case is selected and a case that the target case is not selected. That is, the user can click on the identifying object 108 to select a target human face. By default, all identifying objects 108 may be in a selected or an unselected state. After the selection of the target human face, the user can click on the button 109 to confirm the selection.

When the button 109 is clicked on, the application pops up a pop-up window 110 which includes an input box 111 and a button 112, in which the input box 111 allows the user to enter a total number. After the input is completed, the user can confirm via the button 112. When the button 112 is clicked on, the application determines all target human faces selected by the user based on the selected or unselected state of the identifying object 108, and the target attribute value for each target human face equals to the value obtained by dividing the total number by the number of all target human faces selected by the user. Then, similar to the process after the button 107 is pressed, the application will send an attribute value transfer request to the server 11.

According to this embodiment, the total number needs to be entered only once instead of entering one target attribute value for each target human face, thereby improving efficiency of the attribute value transfer operation, and further enhancing convenience for the user input operation.

Figure 14:
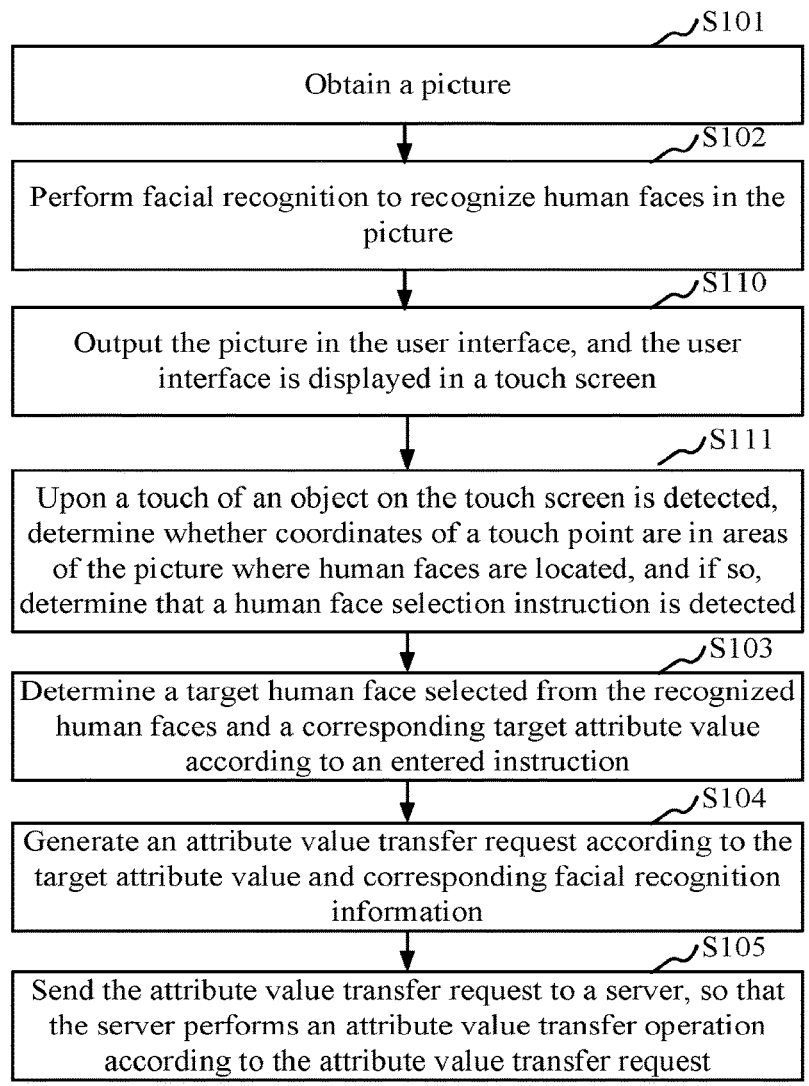
FIG. 14 is a flowchart of a user attribute value transfer method according to another embodiment.

Referring to FIG. 14, in one embodiment, between step S102 and step S103, the method may further include the following steps.

In step S110, a picture is output in the user interface, and the user interface is displayed on a touch screen.

In step S111, upon a touch of an operating object on the touch screen is detected, it is determined whether coordinates of a touch point are in areas of the picture where human faces are located, and if so, it is determined that a human face selection instruction is detected.

During the process of facial recognition, the areas where all human faces are located in the picture 102 are identified. The user interface 101 can detect the click or touch events in the parent vessel of the picture 102, and when these events are triggered, it is determined whether a human face is selected. Said parent vessel means a variety of interface elements (or controls) accommodating the picture 102. In an Android system, for example, the parent vessel may be ImageView controls. Other operating systems are different from the Android system, but they all have similar functional controls.

For a touch screen, the step of determining whether a human face is selected is as follows: obtaining touch point coordinates; determining whether the touch point coordinates are in the areas where the human faces are located; and determining that the user selects a corresponding human face if the touch point coordinates are in an area where the human face is located.

According to this embodiment, the user interface is displayed on the touch screen, so that when an object touches the human face in the picture displayed on the touch screen, a detection for human face selection instruction can be triggered, so that the user can directly and efficiently determine the target human face through the object, thereby further improving operating convenience.

Figure 15:
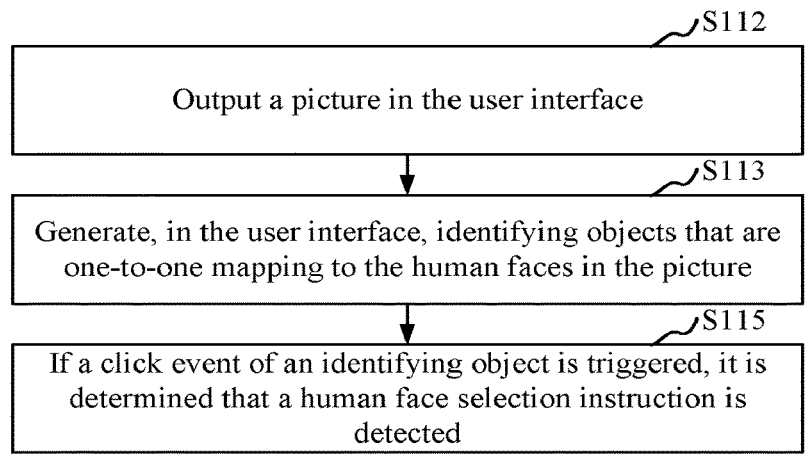
FIG. 15 is a flowchart of detecting a human face selection instruction according to an embodiment.

Referring to FIG. 15, in an embodiment, between step S102 and step S103, the method may further include the following steps.

In step S112, a picture is output in the user interface.

As shown in FIG. 3, the user interface 101 shows the picture 102, and the picture 102 has three human faces 103 therein.

In step S113, on the user interface, identifying objects that are one-to-one mapping to the human faces are displayed in the picture.

A corresponding identifying object 104 may be displayed in the user interface 101 to correspond to the location where the human face is, and the identifying object 104 may be for example a frame or a transparent floating layer.

In step S115, if the registered click event of the identifying object is triggered, it is determined that a human face selection instruction is detected.

Specifically, the first user terminal 21 may register the click event of the identifying object before step S115, and then detect triggering of the click event of the identifying object. If the click event of the identifying object is triggered, it is determined that a human face selection instruction is detected.

According to this embodiment, the identifying object 104 is used to indicate a human face, and in this way, the click or touch event-trigger mechanism of the system can be fully used, without needing to determine whether the touch point coordinates are within the area where the human face is located each time, thereby reducing calculation pressure of comparing the touch point coordinates many times, and improving efficiency of detecting the human face selection instructions.

Figure 16:
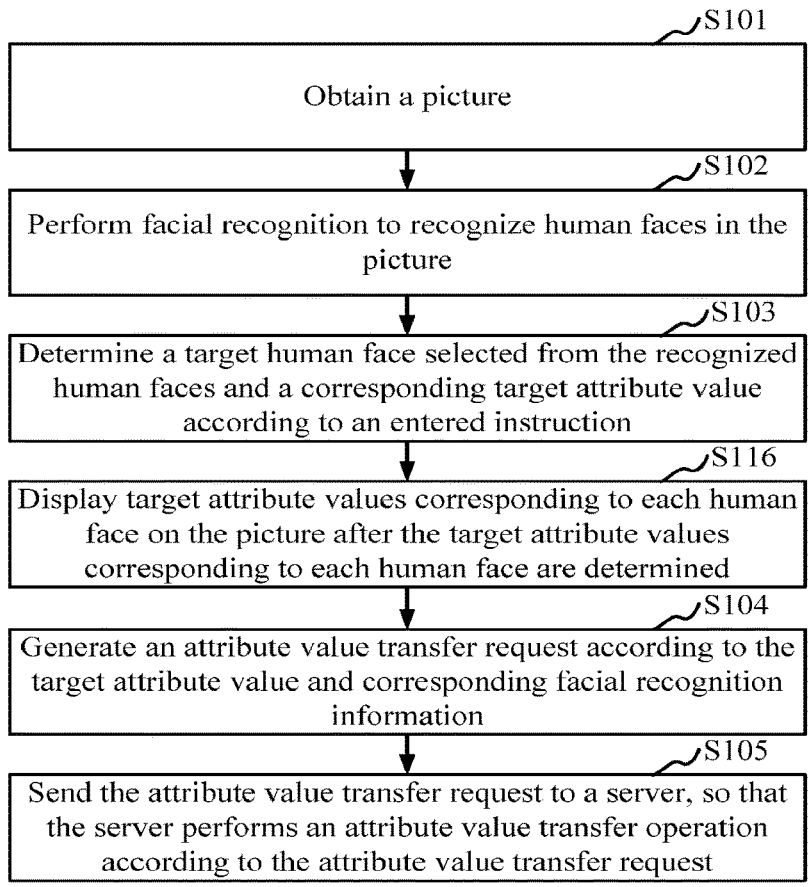
FIG. 16 is a flowchart of a user attribute value transfer method according to an embodiment.

Referring to FIG. 16, in one embodiment, the method further includes the following steps after step S103.

In step S116, after the target attribute value corresponding to each human face is determined, the target attribute value is displayed on the picture.

Referring to FIG. 4, furthermore, in order to allow the user to keep abreast of the entered value, prompt information may also be displayed in the user interface 101. For example, a prompt box 106 may be displayed above the target human face, and the content of the prompt box 106 may include the value just entered by the user. The user may choose a target human face at any time to change the entered value.

Figure 17:
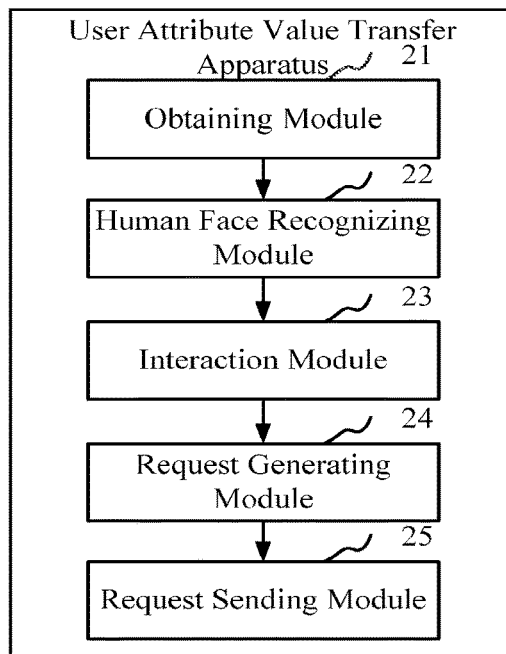
FIG. 17 is a block diagram of a user attribute value transfer device according to an embodiment.

Referring to FIG. 17, in an embodiment, a user attribute value transfer device is provided. As shown in FIG. 17, the device according to this embodiment may include: an obtaining module 21, a human face recognizing module 22, an interaction module 23, a request generating module 24 and a request sending module 25.

The obtaining module 21 may be used to obtain a picture.

An initiating user (a user who initiates an attribute value transfer operation, for example, the initiating user being user A in the present embodiment) starts an application (a stand-alone application or a functional module of an application) installed in the first user terminal 21. Accordingly, after the application is started, an interface of the application is displayed, and in this interface, the user may select a picture stored in the first user terminal 21 or start a shooting function of the first user terminal 21 to take a picture in real time, in which the selected picture or the picture taken in real time needs to include at least a transaction counterparty with which the attribute value transfer operation is to be performed by the user.

The human face recognizing module 22 may be used to perform facial recognition to recognize the human faces within the picture.

A facial recognition algorithm used here is not subject to any restrictions, and all algorithms that are capable of accurately and effectively recognize the human faces can be applied to the present embodiment.

The interaction module 23 may be used to determine the target human face selected from the recognized human faces and corresponding target attribute value according to entered instructions.

After obtaining the picture selected by the user through the application, an interaction with the user is performed according to the selected picture to determine transaction counterparties (target human faces) with which the current user wants to perform attribute value transfers and the target attribute value for each transaction counterparty.

The request generating module 24 may be used to generate an attribute value transfer request according to the target attribute value and corresponding facial recognition information.

The application generates an attribute value transfer request according to the value entered by the user. The attribute value transfer request may include, for example recognition information corresponding to each recognized human face and corresponding values; the attribute value transfer request may also include recognition information of the current user. After the attribute value transfer request is generated, it may also be encrypted.

The request sending module 25 may be used to send the attribute value transfer request to a server, so that the server may perform an attribute value transfer operation according to the attribute value transfer request.

A predetermined network protocol (such as a hypertext transfer protocol) may be used to send the attribute value transfer request to the server 11. After receiving the attribute value transfer request, the server 11 performs an attribute value transfer operation according to the attribute value transfer request.

According to the user attribute value transfer device of the present embodiment, a user can initiate an attribute value transfer operation via a picture. That is, the user needs to only click on a human face in the picture and enter a value to be transferred, without entering a user account, thereby enhancing convenience for the user to initiate an attribute value transfer operation. Moreover, by way of facial recognition, typing errors can be prevented when the user account is entered, so as to enhance security of the attribute value transfer operation.

Figure 18:
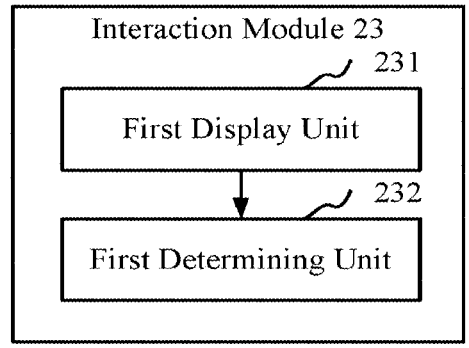
FIG. 18 is a block diagram of an interaction module according to an embodiment.

Referring to FIG. 18, in an embodiment, the interaction module 23 of the user attribute value transfer device may include a first display unit 231 and a first determining unit 232.

The first display unit 231 may be used to display an input interface for reception of a user input in response to an entered human face selection instruction.

In another specific implementation, the human face selection instruction is detected in the following manner. During the process of facial recognition, areas where human faces are located in the picture 102 are identified. Then, corresponding identifying objects 104 may be displayed in the user interface 101 to correspond to locations where the human faces are, and the identifying objects 104 may be for example a frame or a transparent floating layer. The application also detects a click or touch event on an identifying object. If the click or touch event on the identifying object 104 is triggered, it can be determined that the user selects the corresponding human face. Compared with the previously described way, this way can take advantage of the click or touch event-trigger mechanism of the system, and does not need to determine whether the touch point coordinates are within the area where the human face is located each time. In the example shown in FIG. 3, the shape of the identifying object 104 matches the human face; however, it will be appreciated that the identifying object 104 may be a regular shape, such as rectangular, circular, or square, and in such a case, it makes the coordinates determining process much simpler and more efficient by detecting the click or touch event on the identifying object 104.

The first determining unit 232 may be used to determine the target human face that is selected from the recognized human faces corresponding to the human face selection instruction, and determine the value entered in the input interface as the target attribute value corresponding to the target human face.

Upon detecting a user instruction that the user selects a human face, e.g., when an identifying object 104 being clicked on or touched, a text input box 105 may be displayed, to prompt the user to enter a value corresponding to the selected human face, and this value indicates the attribute value that will be transferred between the current user and the user corresponding to the target human face. In a specific embodiment, using a positive number indicates that the current user needs to transfer the attribute value to the user corresponding to the selected target human face; and a negative number indicates that the user corresponding to the selected target human face needs to transfer the attribute value to the current user. Of course, it may also be pre-determined that a positive number indicates that the user corresponding to the selected target human face needs to transfer the attribute value to the current user, while a negative number indicates that the current user needs to transfer the attribute value to the user corresponding to the selected target human face.

According to the present embodiment, the target attribute values may be entered one by one by clicking the human faces, without entering a user account, thereby enhancing convenience for a user to initiate an attribute value transfer operation. Moreover, by the way of facial recognition, typing errors can also be prevented when the user account is entered, so as to enhance security of the attribute value transfer operation.

Figure 19:
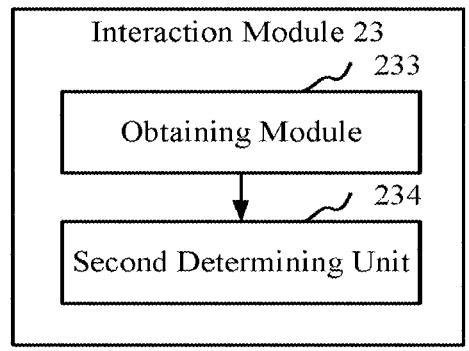
FIG. 19 is a block diagram of an interaction module according to another embodiment.

Referring to FIG. 19, in one embodiment, the interaction module 23 of the user attribute value transfer device may include an obtaining unit 233 and a second determining unit 234.

The obtaining unit 233 may be used to determine the target human face that is selected from the recognized human faces according to the selection instruction, and retrieve the total number entered.

The second determining unit 234 may be used to determine that the target attribute value for the selected target human face equals to a value obtained by dividing the total number by the number of all target human faces.

For example, a user may select the target human face from the picture first. Referring to FIG. 5, according to a manner similar to that in FIG. 3, the user interface may also display identifying objects 108 in the areas where the human faces are located. Both the identifying objects 108 and the identifying objects 104 in FIG. 3 can respond to a user's click or touch event, but the responding manners of the identifying objects 108 and the identifying objects 104 are different. In the manner shown in FIG. 5, the click or touch on the identifying object 108 indicates a switch between a case that a target case is selected and a case that the target case is not selected. That is, the user can click on the identifying object 108 to select a target human face. By default, all identifying objects 108 may be in a selected or an unselected state. After the selection of the target human faces, the user can click on the button 109 to confirm the selection.

When the button 109 is clicked on, the application pops up a pop-up window 110 which includes an input box 111 and a button 112, in which the input box 111 allows the user to enter a total number. After the input is completed, the user can confirm via the button 112. When the button 112 is clicked on, the application determines all target human faces selected by the user based on the selected or unselected state of the identifying object 108, and the target attribute value for each target human face equals to the value obtained by dividing the total number by the number of all target human faces selected by the user. Then, similar to the process after the button 107 is pressed, the application will send an attribute value transfer request to the server 11.

According to this embodiment, the total number needs to be entered only once instead of entering one target attribute value for each target human face, thereby improving efficiency of the attribute value transfer operation, and further enhancing convenience for the user input operation.

Figure 20:
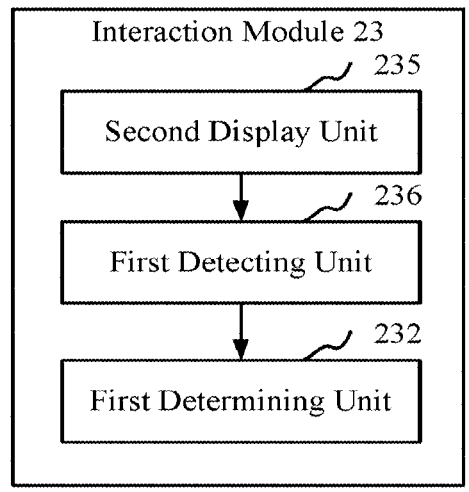
FIG. 20 is a block diagram of an interaction module according to another embodiment yet.

Referring to FIG. 20, in one embodiment, the interaction module 23 of the user attribute value transfer device may also include a second display unit 235 and a first detecting unit 236.

The second display unit 235 may be used to output a picture in the user interface, in which the user interface may be displayed on a touch screen.

The first detecting unit 236 may be used to determine, upon a touch of an operating object on the touch screen is detected, whether coordinates of a touch point are in areas of the picture where human faces are located, and if so, determine that a human face selection instruction is detected.

During the process of facial recognition, the areas where all human faces are located in the picture 102 are identified. The user interface 101 can detect the click or touch events in the parent vessel of the picture 102, and when these events are triggered, determine whether a human face is selected. Said parent vessel means a variety of interface elements (or controls) accommodating the picture 102. In an Android system, for example, the parent vessel may be ImageView controls. Other operating systems are different from the Android system, but they all have similar functional controls.

For a touch screen, the step of determining whether a human face is selected is as follows: obtaining touch point coordinates; determining whether the touch point coordinates are in the areas where the human faces are located; and determining that the user selects a corresponding human face if the touch point coordinates are in an area where the human face is located.

According to this embodiment, by detecting the click event of the parent vessel of the displayed picture, detection for human face selection instruction can be achieved, and this technical solution is simple.

Figure 21:
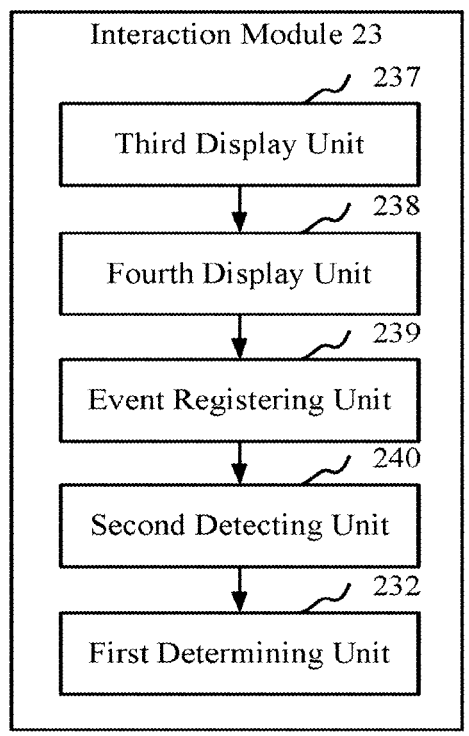
FIG. 21 is a block diagram of an interaction module according to an embodiment.

Referring to FIG. 21, in an embodiment, the interaction module 23 of the user attribute value transfer device may also include a third display unit 237, a fourth display unit 238 and a second detecting unit 240.

The third display unit 237 may be used to output a picture in the user interface.

As shown in FIG. 3, the user interface 101 shows the picture 102, and the picture 102 has three human faces 103 therein.

The fourth display unit 238 may be used to generate, on the user interface, identifying objects that are one-to-one mapping to the human faces in the picture.

A corresponding identifying object 104 may be displayed in the user interface 101 to correspond to the location where the human face is, and the identifying object 104 may be for example a frame or a transparent floating layer.

The second detecting unit 240 may be used to determine that a human face selection instruction is detected if the registered click event of the identifying object is triggered.

This embodiment can take advantage of the click or touch event-trigger mechanism of the system, and does not need to determine whether the touch point coordinates are within the area where the human face is located each time.

Referring to FIG. 21, in an embodiment, the interaction module 23 of the user attribute value transfer device may also include an event registering unit 239 adapted to register the click event of the identifying object.

Figure 22:
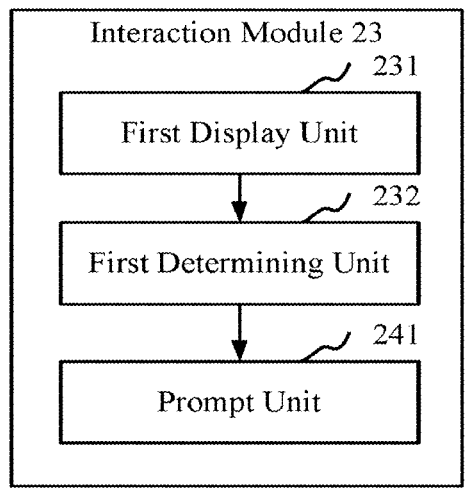
FIG. 22 is a block diagram of a user attribute value transfer device according to another embodiment.

Referring to FIG. 22, in an embodiment, the interaction module 23 of the user attribute value transfer device may also include a prompt unit 241.

The prompt unit 241 may be used to display the target attribute value on the picture after the target attribute values corresponding to each human face is determined.

Referring to FIG. 4, furthermore, in order to allow the user to keep abreast of the entered value, prompt information may also be displayed in the user interface 101. For example, a prompt box 106 may be displayed above the target human face, and the content of the prompt box 106 may include the value just entered by the user. The user may choose a target human face at any time to change the entered value.

Figure 23:
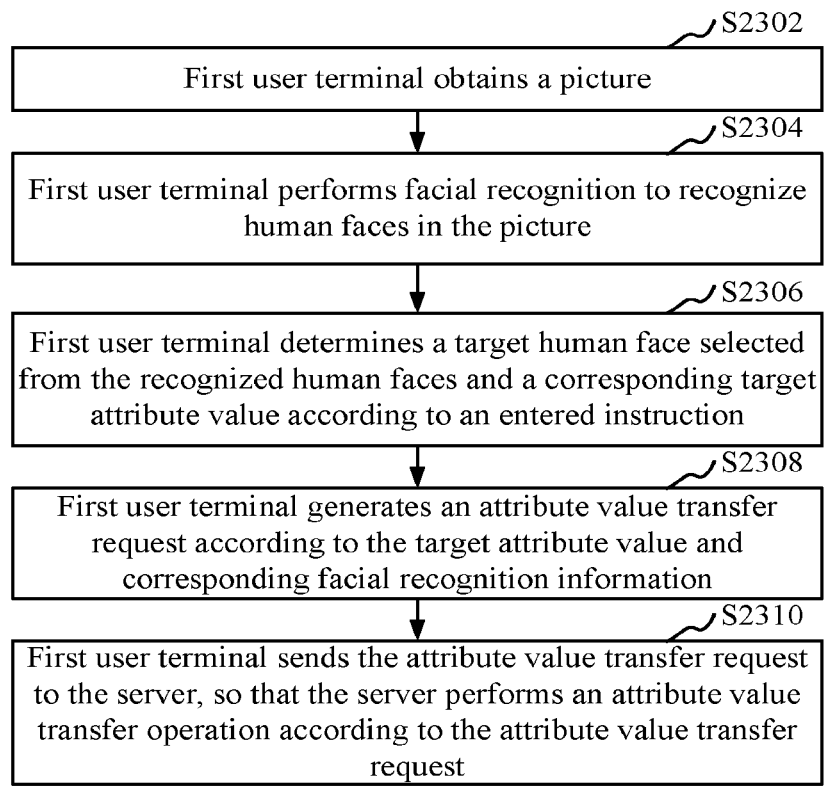
FIG. 23 is a flowchart of a user attribute value transfer method according to an embodiment.

As shown in FIG. 23, in an embodiment, a user attribute value transfer method is provided and this method may include the following steps.

In step S2302, a first user terminal obtains a picture.

In step S2304, the first user terminal performs facial recognition to recognize human faces in the picture.

In step S2306, the first user terminal determines a target human face selected from recognized human faces and determines a corresponding target attribute value according to an entered instruction.

In step S2308, the first user terminal generates an attribute value transfer request according to the target attribute value and corresponding facial recognition information.

In step S2310, the first user terminal sends the attribute value transfer request to a server.

In step S2312, the server performs an attribute value transfer operation according to the attribute value transfer request.

In an embodiment, the step S2306 may include: determining, by the first user terminal, target human faces selected from the recognized human faces according to entered instruction, and obtaining an entered total number; and determining that the target attribute value for the selected target human face equals to a value obtained by dividing the total number by the number of the target human faces.

In an embodiment, the step S2306 may include: displaying, by the first user terminal, an input interface for receiving a user input in response to an entered human face selection instruction; and determining the target human face selected from the recognized human faces corresponding to the human face selection instruction, and determining a value entered in the input interface as the target attribute value corresponding to the target human face.

In an embodiment, the user attribute value transfer method may also include: outputting, by the first user terminal, the picture in the user interface, in which the user interface may be displayed on a touch screen; and upon a touch of an operating object on the touch screen is detected, determining, by the first user terminal, whether coordinates of a touch point are in areas corresponding to human faces in the picture, and if so, determining that the human face selection instruction is detected.

In an embodiment, the user attribute value transfer method may also include: outputting, by the first user terminal, the picture in the user interface; generating, on the user interface, identifying objects that are one-to-one mapping to the human faces in the picture; and determining that the human face selection instruction is detected in response to determining that a click event of the identifying object is triggered.

In an embodiment, the user attribute value transfer method may also include: displaying, by the first user terminal, the target attribute value on the picture after the target attribute values corresponding to each human face is determined.

Figure 24:
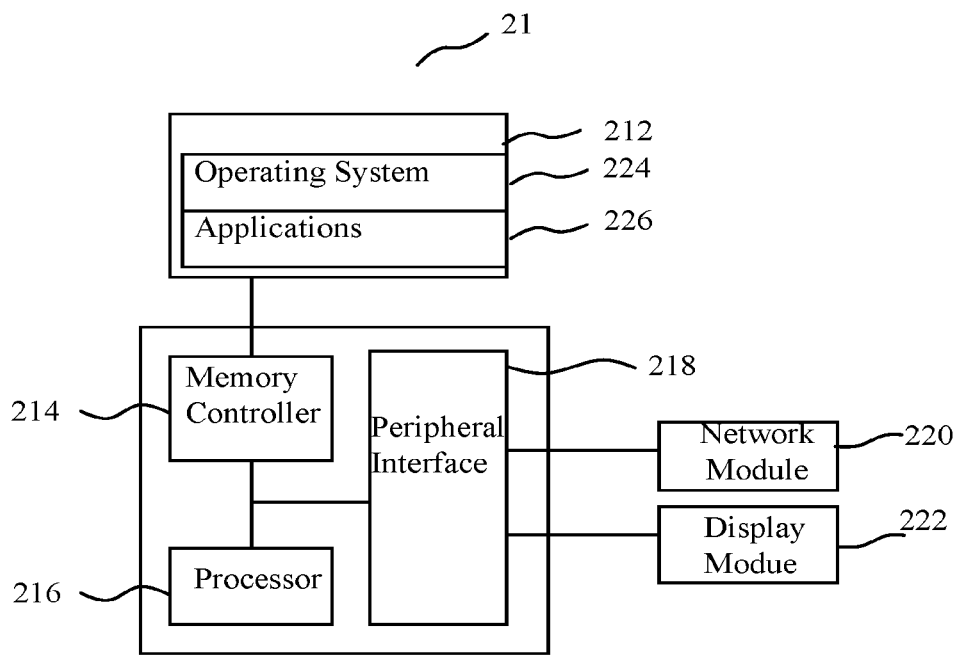
FIG. 24 is a block diagram of a hardware configuration of a user terminal according to an embodiment.

FIG. 24 shows a schematic structure of an embodiment of the above first user terminal 21. It is appreciated that other user terminals may have architectures similar to the first user terminal. As shown in FIG. 24, the first user terminal 21 includes a memory 212, a memory controller 214, one or more (only one is shown) processors 216, a peripheral interface 218, a network module 220, and a display 222. These components communicate with each other via one or more communication bus/signal lines.

It is appreciated that the structure shown in FIG. 24 is only schematic, and the above first user terminal 21 may also include more or fewer components than shown in FIG. 24 or have different configurations compared with FIG. 24. The components shown in FIG. 24 may be implemented in hardware, software, or a combination thereof.

The memory 212 may be used to store software programs and modules, such as program instructions/modules corresponding to each method and device in the embodiments of the present disclosure. The processor 216 performs various functional applications and data processing by running the software programs and modules stored in the memory 212 to achieve the above-described methods.

The memory 212 may include high-speed random access memory and nonvolatile memory, such as one or more magnetic storage devices, flash memory, or other non-volatile solid-state memory. In some examples, the memory 212 may further include a memory remotely relatively located remote from the processor 216, and these remote memories may be connected to the server over a network. Examples of such networks include, but are not limited to the Internet, an intranet, a local area network, a mobile communication network, and combinations thereof. The access for the processor 216 and other possibly components to the memory 212 can be carried out under the control of the memory controller 214.

The peripheral interface 218 couples various input/output devices to the processor 216. The processor 216 runs a variety of software within the memory 212, and commands the server to perform various functions and data processing. In some embodiments, the peripherals interface 218, the processor 216 and the memory controller 214 may be implemented in a single chip. In other instances, they may be implemented by separate chips, respectively.

The network module 220 is used to receive and transmit network signals. The network signal may include a wireless signal or wired signal. In one example, the above network signal is a wired network signal. In this case, the network module 220 may include a processor, a random access memory, a converter, crystal oscillators and other components. In one embodiment, the above network signal is a wireless signal (e.g., RF signals). In this case, the network module 220 is essentially a radio frequency module for receiving and transmitting electromagnetic waves, and converting electromagnetic waves to electrical signals and vice versa, so that to achieve a communication with a communication network or other devices. RF module may include a variety of conventional circuit elements for performing these functions, e.g., an antenna, a RF transceiver, a digital signal processor, the encryption/decryption chip, a subscriber identity module (SIM) card, memory, and so on. RF module can communicate with a variety of networks such as the Internet, intranets, wireless networks, or communicate with other devices through a wireless network. The above wireless network may include a cellular telephone network, a wireless LAN or MAN. The above wireless network can use a variety of communications standards, protocols and technologies, including but not limited to Global System for Mobile Communications (GSM), enhanced mobile communications technology (EDGE), wideband code division multiple access technology (wideband code division multiple access, W-CDMA), CDMA technology (CDMA), Time division multiple Access technology (TDMA), wireless fidelity technology (WiFi) (such as the American Institute of electrical and Electronics engineers standard IEEE 802.11a, IEEE 802.11b, IEEE802.11g and/or IEEE 802.11n), Voice over Internet protocol, (VoIP), worldwide Interoperability for microwave access (Wi-Max), other protocols for e-mail, instant messaging and short message, as well as any other suitable communication protocols, even including those agreements currently not yet been developed.

The display module 222 may be used to display information input by the user, the information provided to the user, and various graphical user interfaces, wherein these graphical user interfaces may be formed of graphics, text, icons, video, and any combination thereof. In one example, the display module 222 includes a display panel. The display panel can be such as a liquid crystal panel (LCD), an organic light-emitting diode (OLED) display panel, an electro-phoretic display panel (EPD) and the like. Further, the touch surface may be provided on the display panel to form a whole entity. In other embodiments, the display module 222 may also include other types of display devices, e.g., a projection display apparatus. Compared to a general display panel, the projection display apparatus needs to include a number of components such as a lens group for projecting.

The above-mentioned software programs and modules may include an operating system 224 and applications 226. The operating system 224 may include a variety of software components and/or drivers for managing system tasks (such as memory management, storage device control, power management, etc.), and communicate with a variety of hardware or software components, to provide runtime environment for other software components. Application 22 runs on the operating system 224, for implementing the various methods in the above mentioned embodiments.

Further, embodiments of the present disclosure further provide a computer-readable storage medium having computer-executable instructions stored therein; said computer-readable storage medium may be a non-transitory memory such as optical disks, hard disks, or flash memory. The above computer-executable instructions may be executed by a computer or a like arithmetic device to achieve the methods described in the above embodiments.

The foregoing is only embodiments of the present disclosure and is not intended to limit the present disclosure in any forms. Although the present disclosure is disclosed as the embodiments, however, these descriptions are not intended to limit the present disclosure, and any ordinary skilled in the art may use the above disclosed technology to make some modifications and changes to the disclosed technical contents to obtain equivalent embodiments without departing from the scope of the present disclosure. Any modification, equivalent, and change made to the above embodiments according to the essential technical of the present disclosure and without departing from the scope of the present disclosure, will fall into the scope of the present disclosure.

What is claimed is:

1. A user attribute value transfer method performed at a mobile terminal having one or more processors and memory storing programs to be executed by the one or more processors, comprising:
   obtaining a picture including multiple human faces;
   receiving a user instruction for performing facial recognition to the picture;
   in response to the user instruction, highlighting each of the multiple human faces by a corresponding face identifying object;
   receiving a user selection of two or more face identifying objects, each face identifying object corresponding to a respective one of the highlighted human faces in the picture;
   displaying an input box after the user completes the selection of the two or more face identifying objects;
   receiving a user-inputted total target attribute value in the input box; and
   dividing the user-inputted total target attribute value into multiple portions based on a number of the user-selected two or more face identifying objects, each portion being part of the user-inputted target attribute value for a corresponding user-selected face identifying object;
   generating one attribute value transfer request according to the user-inputted target attribute values, facial recognition information associated with the two or more face identifying objects, and a first user identifier associated with the mobile terminal; and
   sending the attribute value transfer request to a remote server, wherein the server determines a second user identifier based on the facial recognition information associated with each of the two or more face identifying objects, verifies whether the second user identifier is on a user-relationship chain of the first user identifier, and transfers a corresponding user-inputted target attribute value between the first user identifier and the second user identifier when the second user identifier is on the user-relationship chain of the first user identifier.

2. The user attribute value transfer method of claim 1, wherein, when the second user identifier is not on the user-relationship chain of the first user identifier, the server returns a request for further user confirmation to the mobile terminal and performs the corresponding user-inputted target attribute value between the first user identifier and the second user identifier after receiving the user confirmation from the mobile terminal.

3. The user attribute value transfer method of claim 1, wherein the step of highlighting each of the multiple human faces by a corresponding face identifying object further comprises:
   for each recognized human face, overlaying the corresponding face identifying object on top of the recognized human face.

4. The user attribute value transfer method of claim 1, wherein the two or more face identifying objects corresponding to different human faces have different shapes.

5. The user attribute value transfer method of claim 1, wherein the step of receiving a user selection of two or more face identifying objects corresponding to two or more of the highlighted human faces in the picture and a user-inputted target attribute value for each of the user-selected two or more face identifying objects further comprises:
   displaying an input box next to a user-selected face identifying object;
   receiving a corresponding user-inputted target attribute value in the input box; and
   replacing the input box with a prompt box above the user-selected face identifying object after receiving a user confirmation, the prompt box including the user-inputted target attribute value.

6. The user attribute value transfer method of claim 1, wherein the step of receiving a user selection of two or more face identifying objects corresponding to two or more of the highlighted human faces in the picture further comprises:
   generating a visual indicator on each user-selected face identifying object corresponding to one of the two or more of the highlighted human faces in the picture.

7. The user attribute value transfer method of claim 1, further comprising:
   displaying the target attribute values corresponding to the user-selected two or more face identifying objects in the picture before generating the attribute value transfer request.

8. A mobile terminal, comprising:
   a processor;
   a storage medium; and a plurality of instructions stored in the storage medium that, when executed by the processor, cause the mobile terminal to perform the steps of:
  obtaining a picture including multiple human faces;
  receiving a user instruction for performing facial recognition to the picture;
  in response to the user instruction, highlighting each of the multiple human faces by a corresponding face identifying object;
  receiving a user selection of two or more face identifying objects, each face identifying object corresponding to a respective one of the highlighted human faces in the picture;
  displaying an input box after the user completes the selection of the two or more face identifying objects;
  receiving a user-inputted total target attribute value in the input box; and
  dividing the user-inputted total target attribute value into multiple portions based on a number of the user-selected two or more face identifying objects, each portion being part of the user-inputted target attribute value for a corresponding user-selected face identifying object;
  generating one attribute value transfer request according to the user-inputted target attribute values, facial recognition information associated with the two or more face identifying objects, and a first user identifier associated with the mobile terminal; and
  sending the attribute value transfer request to a remote server, wherein the server determines a second user identifier based on the facial recognition information associated with each of the two or more face identifying objects, verifies whether the second user identifier is on a user-relationship chain of the first user identifier, and transfers a corresponding user-inputted target attribute value between the first user identifier and the second user identifier when the second user identifier is on the user-relationship chain of the first user identifier.

9. The mobile terminal of claim 8, wherein, when the second user identifier is not on the user-relationship chain of the first user identifier, the server returns a request for further user confirmation to the mobile terminal and performs the corresponding user-inputted target attribute value between the first user identifier and the second user identifier after receiving the user confirmation from the mobile terminal.

10. The mobile terminal of claim 8, wherein the step of highlighting each of the multiple human faces by a corresponding face identifying object further comprises:
  for each recognized human face, overlaying the corresponding face identifying object on top of the recognized human face.

11. The mobile terminal of claim 8, wherein the two or more face identifying objects corresponding to different human faces have different shapes.

12. The mobile terminal of claim 8, wherein the step of receiving a user selection of two or more face identifying objects corresponding to two or more of the highlighted human faces in the picture and a user-inputted target attribute value for each of the user-selected two or more face identifying objects further comprises:
  displaying an input box next to a user-selected face identifying object;
  receiving a corresponding user-inputted target attribute value in the input box; and
  replacing the input box with a prompt box above the user-selected face identifying object after receiving a user confirmation, the prompt box including the user-inputted target attribute value.

13. The mobile terminal of claim 8, wherein the step of receiving a user selection of two or more face identifying objects corresponding to two or more of the highlighted human faces in the picture further comprises:
  generating a visual indicator on each user-selected face identifying object corresponding to one of the two or more of the highlighted human faces in the picture.

14. The mobile terminal of claim 8, where the steps further comprise:
  displaying the target attribute values corresponding to the user-selected two or more face identifying objects in the picture before generating the attribute value transfer request.

15. A non-transitory computer readable storage medium in connection with a mobile terminal storing a plurality of instructions that, when executed by a processor of the mobile terminal, cause the mobile terminal to perform the steps of:
  obtaining a picture including multiple human faces;
  receiving a user instruction for performing facial recognition to the picture;
  in response to the user instruction, highlighting each of the multiple human faces by a corresponding face identifying object;
  receiving a user selection of two or more face identifying objects, each face identifying object corresponding to a respective one of the highlighted human faces in the picture;
  displaying an input box after the user completes the selection of the two or more face identifying objects;
  receiving a user-inputted total target attribute value in the input box; and
  dividing the user-inputted total target attribute value into multiple portions based on a number of the user-selected two or more face identifying objects, each portion being part of the user-inputted target attribute value for a corresponding user-selected face identifying object;
  generating one attribute value transfer request according to the user-inputted target attribute values, facial recognition information associated with the two or more face identifying objects, and a first user identifier associated with the mobile terminal; and
  sending the attribute value transfer request to a remote server, wherein the server determines a second user identifier based on the facial recognition information associated with each of the two or more face identifying objects, verifies whether the second user identifier is on a user-relationship chain of the first user identifier, and transfers a corresponding user-inputted target attribute value between the first user identifier and the second user identifier when the second user identifier is on the user-relationship chain of the first user identifier.

16. The non-transitory computer readable storage medium of claim 15, wherein the step of highlighting each of the multiple human faces by a corresponding face identifying object further comprises:
  for each recognized human face, overlaying the corresponding face identifying object on top of the recognized human face.

17. The non-transitory computer readable storage medium of claim 15, wherein the two or more face identifying objects corresponding to different human faces have different shapes.

18. The non-transitory computer readable storage medium of claim 15, wherein the step of receiving a user selection of two or more face identifying objects corresponding to two or more of the highlighted human faces in the picture and a user-inputted target attribute value for each of the two or more user-selected face identifying objects further comprises:
- displaying an input box next to a user-selected face identifying object;
- receiving a corresponding user-inputted target attribute value in the input box; and
- replacing the input box with a prompt box above the user-selected face identifying object after receiving a user confirmation, the prompt box including the user-inputted target attribute value.

19. The non-transitory computer readable storage medium of claim 15, wherein the step of receiving a user selection of two or more face identifying objects corresponding to two or more of the highlighted human faces in the picture further comprises:
- generating a visual indicator on each user-selected face identifying object corresponding to one of the two or more of the highlighted human faces in the picture.

20. The non-transitory computer readable storage medium of claim 15, where the steps further comprise:
- displaying the target attribute values corresponding to the user-selected two or more face identifying objects in the picture before generating the attribute value transfer request.

* * * * *